United States Patent
Tang et al.

(10) Patent No.: US 10,402,626 B2
(45) Date of Patent: Sep. 3, 2019

(54) RECOGNITION OF HUMAN FACES BASED ON POPULATION VERIFIED REPRODUCIBLE MEASUREMENTS BETWEEN FACIAL ANTHROPOLOGICAL LANDMARKS ON 2 DIMENSIONAL OR 3 DIMENSIONAL HUMAN PHOTOGRAPHS

(71) Applicant: M and M Technologies Limited, Central (HK)

(72) Inventors: Tin Hong Alexander Tang, Hong Kong (HK); Roger Arthur Zwahlen, Hong Kong (HK); Yasas Sri Nalaka Jayaratne, Farmington, CT (US)

(73) Assignee: M and M Technologies Limited, Central (HK)

( * ) Notice: Subject to any disclaimer, the term of this patent is extended or adjusted under 35 U.S.C. 154(b) by 0 days.

(21) Appl. No.: 15/058,905

(22) Filed: Mar. 2, 2016

(65) Prior Publication Data

US 2016/0259966 A1    Sep. 8, 2016

Related U.S. Application Data

(60) Provisional application No. 62/105,738, filed on Mar. 2, 2015.

(51) Int. Cl.
*G06K 9/00* (2006.01)
(52) U.S. Cl.
CPC ..... *G06K 9/00281* (2013.01); *G06K 9/00288* (2013.01); *G06T 2207/30201* (2013.01)
(58) Field of Classification Search
None
See application file for complete search history.

(56) References Cited

U.S. PATENT DOCUMENTS

| | | | |
|---|---|---|---|
| 2005/0084140 A1* | 4/2005 | Kakadiaris | G06K 9/00214 382/118 |
| 2009/0180673 A1* | 7/2009 | DeGutis | G06K 9/00221 382/118 |

(Continued)

OTHER PUBLICATIONS

Anicÿ-Miloševicÿ, Sandra, Marina Lapter-Varga, and Mladen Šlaj. "Analysis of the soft tissue facial profile by means of angular measurements." The European Journal of Orthodontics 30.2 (2008): 135-140. 6 pages.*

(Continued)

*Primary Examiner* — Ryan P Potts
(74) *Attorney, Agent, or Firm* — Akerman LLP

(57) ABSTRACT

A method of facial recognition has been developed by the application of a statistical method, standard deviations or standard errors versus sample number plots, to differentiate the degree of reproducibilities of various measurements between facial anthropological landmarks in individual ethnic groups. Reproducible measurements between facial anthropological landmarks in a particular ethnic group mean they are common features shared by individuals of that ethnic group. Non-reproducible measurements are unique features of each individual in that ethnic group which may be used for individual facial recognition purposes. Such methodology may be computerized for automatic facial recognition. A large amount of data of each ethnic group is needed for facial recognition. In turn, the development of databases of each ethnic group will result in a large amount of data of human faces.

5 Claims, 3 Drawing Sheets

(56) References Cited

U.S. PATENT DOCUMENTS

| | | | |
|---|---|---|---|
| 2009/0185723 A1* | 7/2009 | Kurtz | G06K 9/00288 |
| | | | 382/118 |
| 2013/0223694 A1* | 8/2013 | Ricanek, Jr. | G06K 9/00221 |
| | | | 382/118 |
| 2015/0178554 A1* | 6/2015 | Kanaujia | G06T 19/20 |
| | | | 382/118 |

OTHER PUBLICATIONS

Oladipo, G. S., M. A. Eroje, and H. B. Fahwehinmi. "Anthropometric comparison of nasal indices between Andoni and Okrika tribes of Rivers State, Nigeria." International Journal of Medicine and Medical Sciences 1.4 (2009): 135-137. 3 pages.*

Gupta, Shalini, Mia K. Markey, and Alan C. Bovik. "Anthropometric 3D face recognition." International journal of computer vision 90.3 (2010): 331-349. 19 pages.*

Simon, Steve. "StATS: Relationship between the Standard Deviation and the Sample Size (May 26, 2006)." pmean.com. N.p., May 26, 2006. Web. Mar. 28, 2018. 14 pages.*

Kirk, David. "The Virtual Irrelevancy of Population Size to Required Sample Size." Twentythirdfloor.co.za. N.p., Apr. 5, 2013. Web. Mar. 28, 2018. 9 pages.*

* cited by examiner the benefit of U.S. Provisional Application No. 62/105,738 filed Mar. 2, 2015, which is incorporated herein by reference.

RECOGNITION OF HUMAN FACES BASED ON POPULATION VERIFIED REPRODUCIBLE MEASUREMENTS BETWEEN FACIAL ANTHROPOLOGICAL LANDMARKS ON 2 DIMENSIONAL OR 3 DIMENSIONAL HUMAN PHOTOGRAPHS

This application claims the benefit of U.S. Provisional Application No. 62/105,738 filed Mar. 2, 2015, which is incorporated herein by reference.

FIELD OF THE INVENTION

The present invention relates to a human face recognition method, especially to a face recognition method based on population verified reproducibility of measurements between facial anthropological landmarks on 2 dimensional (2-D) and 3 dimensional (3-D) human photographs.

BACKGROUND OF THE INVENTION

Owing to the rapid development of multimedia technology in recent years, human face recognition technologies have been widely used in various application fields. Facial recognition is useful and important in occasions where accurate identification of persons is the only way to protect one's own, organizations' or countries' interest, e. g. at immigration check points, office security, bank account management, counter-terrorism, etc.

Facial recognition has advantages over other biometric human recognition traits, e. g. finger prints, handprints, voice recognition, retinal recognition, and signatures as it is less invasive, encompasses more details for the recognition process to work on and requires less cooperation of those under investigation.

Human minds reflexively recognize familiar faces. Hardware of automatic facial recognition to date is available due to rapid development in the area of microcomputers. The software of facial recognition is largely based on facial topological morphing, as shown in FIG. 1.

In a biometric system, facial recognition may have 2 aspects. First, facial authentication is defined as a one-to-one match between the face under investigation against a known facial image of a database. Second, facial identification is defined as a one-to-many facial matching between the face under investigation versus multiple faces of a database.

Such matching is largely carried out by comparison of facial morphologies in face authentication and identification processes, typically using facial topological morphing methods. Common sources of errors in facial recognition are ambient illumination, facial position, facial expression, aging, hair style, face wears/pierces, etc.

These errors may be minimised by putting the face under investigation in a standardised positioning under standardised illumination. However, factors like aging, hair style, facial wear and piercings may still be difficult to control. Subtle differences between individuals e. g. between twins, may give rise to further error sources in facial recognition when using topology morphing method.

Moreover, errors related to facial positioning and ambient illumination of the face under investigation may be impossible to control in non-standardised positions, e. g. group photos, in motion video or surveillance camera.

Such errors imply much information load when performing the comparison calculation, consume too much time and resources and compromise accuracy of facial recognition.

This gives rise to a need for alternative method(s) in facial recognition processes without such errors. Linear and angular measurements between anthropological landmarks may overcome such errors. However, there is not yet any idea which lines or angles of the face are to be measured. Which lines or angles of the face are similar within the same ethnic group? Which lines or angles of the face under investigation are unique? The knowledge of such unique measurements between facial anthropological landmarks in the same ethnic group is of utmost importance for such an approach of facial recognition.

Big data is needed to enable such a method of facial recognition. In turn, measuring lines and angles between facial anthropological landmarks and assessing the reproducibility of such measurements in specific ethnic groups will generate big data.

Therefore, in order to overcome the drawbacks exist in the prior art, a method for face recognition and analysis is provided. The particular design in the present invention does not only solve the problems described above, but it is also easy to be implemented. Thus, the present invention has potential applications in the industry.

SUMMARY OF THE INVENTION

To solve the aforesaid problems, the present invention provides a human face recognition method based on population verified reproducibility of measurements between facial anthropological landmark on 2 dimensional (2-D) or 3 dimensional (3-D) human photographs.

According to an aspect of the invention, the facial recognition method has been developed based on the application of a statistical method, i.e. cumulative standard deviations (SD) or cumulative standard errors (SE) versus sample number (n) plots, to differentiate the degree of reproducibilities of various measurements between facial anthropological landmarks in individuals of ethnic groups. Reproducible measurements between facial anthropological landmarks in a particular ethnic group mean they are common features shared by individuals of that particular ethnic group. Non-reproducible measurements are unique features of each individual in that ethnic group which may be used for individual facial recognition purposes. Such methodology may be computerized for automatic facial recognition. A large sample size and hence a large amount of data of each ethnic group are needed for facial recognition. In turn, the development of databases of each ethnic group will result in a database of human faces including information about which measurements are reproducible within a population or ethnic group, and are thus not necessarily unique to each individual and which measurements are non-reproducible that have been identified by the invention.

The present invention of measurements between human facial anthropological landmarks has overcome the problems of facial topological morphing, e. g. illumination, positioning, hairstyle, facial wears/piercings and aging. In a conventional sense, government immigration departments, companies, banks, financial institutions, etc, may find advantages of a combination of individual 2-D or 3-D facial landmark measurements for facial recognition. Their practical uses include, but are not limited to, facial recognition of a person at immigration checkpoints, the identification of terrorists, limiting accessibility of individual staff to specific company zones, etc.

Thinking out of the box, if one knows the special features of her/his own face, she/he may set up handpicked passwords made of 2-D or 3-D facial measurements for desirable purposes. An individual may choose a combination of landmark measurements of her-/himself for facial authentication/identification purposes. For example, if an individual knows that the measurement between their left and right exocanthion (ex) and left and right alare (al) are features on their face that is non-reproducible and thus unique within their ethnic group, they can set these measurements as one combination lock to be used in an authentication process. Practical uses include, but are not limited to, passwords for automated teller machines, door/gate locks, passports, credit cards, smartphone lock/encryption, computer and other devices lock/encryption. Advantages over existing methods include environment friendliness and sustainability by reducing plastic card use; no need to remember passwords; no need to wait for card issuing; no need to risk card failure; and avoid loss/theft of cards/body parts (e.g. finger for finger print).

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

These and other features, aspects and advantages of the present invention will become better understood with regard to the following description, appended claims, and drawings where:

DETAILED DESCRIPTION OF THE INVENTION

Figure 1:
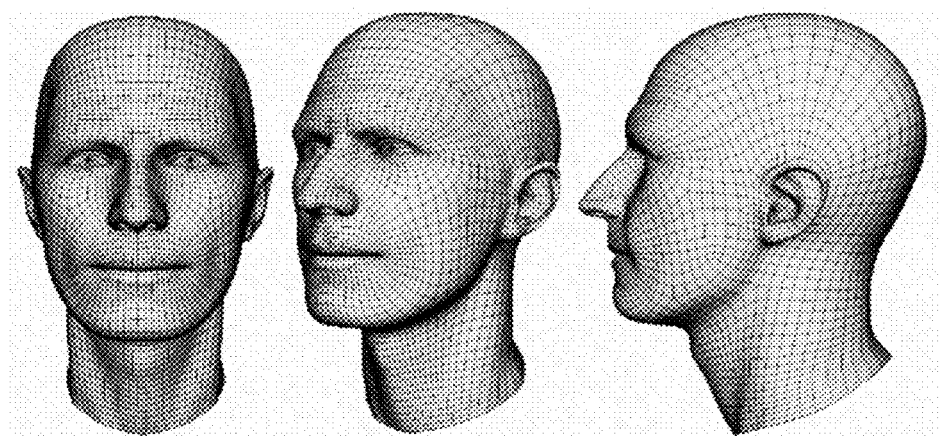
FIG. 1 is a schematic view of an example of facial topological morphing.
Figure 2:
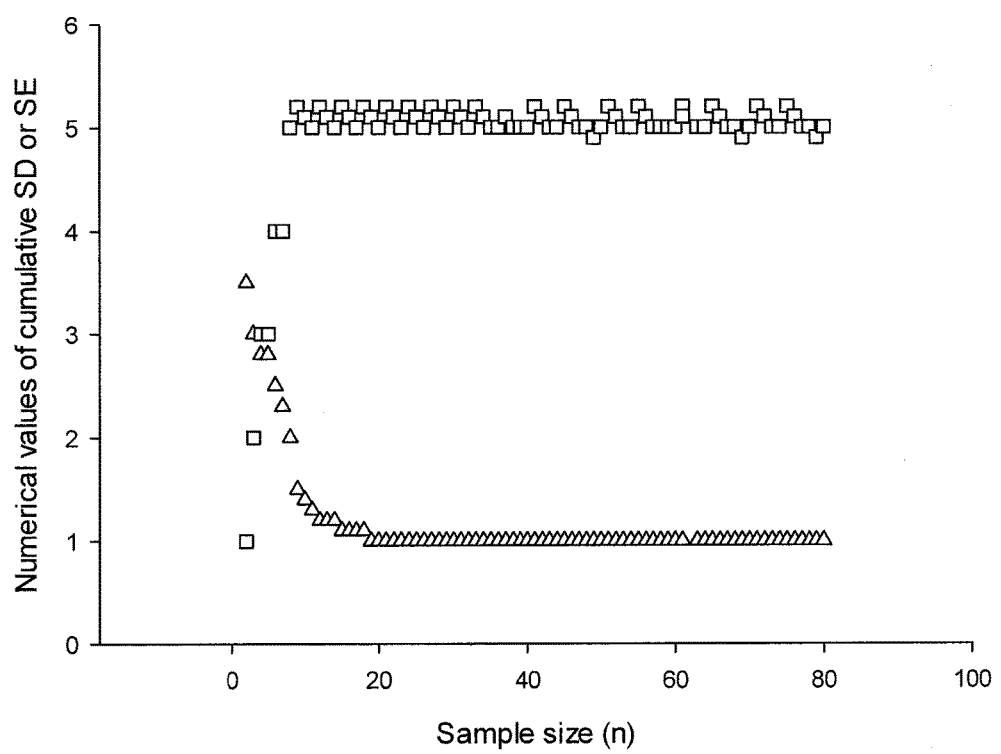
FIG. 2 is a schematic view of an example of SD and SE vs. n plots (SE=△, SD=☐)
Figure 3A:
FIGS. 3a and 3b are schematic views of examples of human facial anthropological landmarks.
Figure 3B:

Referring to FIG. 2, to FIG. 3a and to FIG. 3b of the drawings and in accordance with the principles of the invention, the present invention uses an established and robust statistical method to assess reproducibility of measurements between facial anthropological landmarks.

When studying any natural phenomena, the findings may either be reproducible or non-reproducible. Reproducible observations of a natural phenomenon carry with it small variations but the core phenomenon remains the same. Statistically, the core phenomenon is record as the mean value (x) after many observations (n) of that phenomenon. Statistically, the small variations are calculated as standard deviation (SD) from the mean value. Standard error (SE) may be further calculated from SD.

For every additional observation (n+1) of a specific natural phenomenon, there will be a new mean value (x+1), a new SD (SD+1) and a new SE (SE+1). For a non-reproducible phenomenon, cumulative new SD values will indefinitely increase due to an infinite amount of variations in that phenomenon. SE in a non-reproducible phenomenon, as a function of SD, will indefinitely decrease. For a reproducible phenomenon, cumulative new SD values will level off after an initial increase due to a limited amount of variations in that phenomenon. SE, in a reproducible phenomenon, as function of SD, will level off after an initial decrease, as shown in FIG. 2.

By plotting cumulative SD values to their corresponding sample numbers (n), a reproducible phenomenon may be identified as a plateau off curve of an initial rising SD vs n curve. Cumulative SE values may also be plotted against n to give a decreasing curve that eventually level off, as shown in FIG. 2.

The present invention of facial recognition starts with randomly collecting a number of individuals of the same gender and population for taking 2-D or 3-D photographs in standardized positions. Facial anthropological landmarks are identified as shown in FIG. 3a and FIG. 3b with their definitions, on their 2-D or 3-D photographs. Linear measurements (e.g. a linear measurement from the trichion to the glabella tr-g, or from the trichion to the nasion tr-N) or angular measurements (e.g. an angular measurement between the lines from the trichion to the glabella tr-g, or from the trichion to the nasion tr-N) can be made between human facial anthropological landmarks of each human facial 2-D or 3-D photograph. Each linear measurement is measured between at least 2 anthropological landmarks. Each angular measurement is measured between at least 3 anthropological landmarks. Each repeated linear or angular measurement between sampled individuals, starting from the first (n=1) and second (n=2) individual, is calculated for their x, SD and SE. Then, for any additional repeated measurements made on study subjects, i.e. n=1, 2, 3 followed by n=1, 2, 3, 4, etc., new sets of x, SD and SE are calculated. Cumulative SD and/or cumulative SE may be plotted against the number of individuals (n) measured for that particular linear or angular measurement, as shown in FIG. 2.

If that particular linear or angular measurement is reproducible by the application of cumulative SE vs n plots that show SE values drop with increasing number of individuals studied until a certain level at which a further increase in the number of individuals (n) studied will not show any further decrease in SE on SE vs n curve as shown in FIG. 2.

If that particular linear or angular measurement is reproducible by the application of cumulative SD vs n plots that show SD values rise with increasing number of individuals studied until a certain level of SD at which any further increase in the number of individuals (n) studied will not show any further increase in SD on the SD vs. n curve as shown in FIG. 2.

Reproducibility of each linear or angular measurement made from anthropological landmarks of any population may be studied in the same way.

Assessment of landmark measurements' reproducibility may reveal which measurements are reproducible in that particular selected or ethnic population; hence such measurements are being shared by many individuals of that population. On the contrary, non-reproducible measurements may be unique to each individual, and therefore are of good value for individual facial recognition. A combination of 2 or more of such non-reproducible measurements will enhance the accuracy of individual facial recognition. The said non-reproducible measurements can be applied for facial recognition with improved accuracy in ethnic groups and reproducible measurements define facial characteristics of individuals in ethnic groups.

The present invention of facial recognition of 2-D or 3-D photographs of human faces may work together with other facial recognition methods; e.g. retinal examination, to enhance its accuracy level. Also, present invention of facial recognition may be accelerated with computer automatic processes.

Refer to FIG. 3a and FIG. 3b, the definitions of anthropological facial landmarks on 2D or 3D human photographs are listed below.

a. Trichion (tr)—A point on the hairline in the middle of the forehead.
b. Glabella (g)—The most prominent midline point between the eyebrows.
c. Nasion (n)—The midpoint on the soft tissue contour of the base of the nasal root.
d. Subnasale (sn)—The midpoint of the junction of the columella base and the cutaneous surface of the upper lip.
e. Stomion (sto)—The midpoint of the labial fissure when the lips are closed naturally.
f. Sublabiale (sl)—The midpoint of the labiomental sulcus.
g. Pogonion (pg)—The most anterior midpoint of the chin.
h. Gnathion (gn)—The most anterior and inferior point on the soft tissue chin.
i. Tragion (t)—The most superior aspect of the tragus where it abuts the face.
j. Alare (al)—The most lateral point on each alar contour.
k. Cheilion (ch)—The most lateral aspect of the vermilion border of the corner of the mouth.
l. Endocanthion (en)—The inner corner of the eye fissure where the eyelids meet.
m. Exocanthion (ex)—The outer corner of the eye fissure where the eyelids meet.

Although the present invention has been described in considerable detail in reference to preferred versions, other versions are possible. Therefore, the spirit and scope of the appended claims should not be limited to the description of the preferred versions contained herein.

What is claimed is:

1. A method of facial recognition of human faces based on reproducibility of linear and/or angular measurements between facial anthropological landmarks on 2 dimensional or 3 dimensional human photographs, comprising the steps of:

selecting a population and randomly collecting male and female individuals from said population, taking 2-D or 3-D photographs of their faces, sorting these 2-D or 3-D photographs by their genders, identifying anthropological facial landmarks on said 2-D or 3-D photographs of a selected gender and making linear and/or angular measurements between anthropological facial landmarks;

wherein said each linear measurement is measured between at least 2 anthropological landmarks;

wherein said each angular measurement is measured between at least 3 anthropological landmarks;

calculating the mean value, standard deviation (SD) and standard error (SE) for said each linear or angular measurement for the selected gender of the selected population (n) starting from a first (n=1) individual having the selected gender and being recalculated for each additional following individual having the selected gender;

plotting cumulative standard deviation (SD) and/or cumulative standard error (SE) for the selected gender of the selected population against the number of individuals (n) of the selected gender of the selected population measured for that particular linear or angular measurement;

identifying, based on the cumulative SE and/or SD vs n plots, which of said linear and/or angular measurements are reproducible and shared within the selected gender of the selected population, and which of said linear and/or angular measurements are non-reproducible and may be unique to an individual; and utilizing, by a computer processor, two or more of the identified non-reproducible measurements, to identify a particular individual via facial recognition.

2. The method of facial recognition of human faces of claim 1, wherein a particular linear or angular measurement is reproducible for the selected gender of the selected population by the application of the cumulative SE vs n plots that show SE values drop with increasing number of individuals of the selected gender of the selected population studied until a certain level at which a further increase in the number of individuals (n) of the selected gender of the selected population studied will not show any further decrease in SE.

3. The method of facial recognition of human faces of claim 1, wherein a particular linear or angular measurement is reproducible for the selected gender of the selected population by the application of the cumulative SD vs n plots that show SD values rise with increasing number of individuals of the selected gender of the selected population studied until a certain level of SD at which any further increase in the number of individuals (n) of the selected gender of the selected population studied will not show any further increase in SD.

4. The method of facial recognition of human faces of claim 1, wherein said reproducibility of each linear or angular measurement made from anthropological landmarks of any selected population may be studied in the same way.

5. The method of facial recognition of human faces of claim 1, wherein said reproducible measurements define facial characteristics of individuals in the selected gender of the selected population.

* * * * *